Sept. 23, 1952   K. J. VAUGHN   2,611,453
HYDRAULIC DISK BRAKE

Filed July 6, 1951   2 SHEETS—SHEET 1

INVENTOR
KENNETH J. VAUGHN,
BY
McMorrow, Berman & Davidson
ATTORNEYS

Sept. 23, 1952 K. J. VAUGHN 2,611,453
HYDRAULIC DISK BRAKE
Filed July 6, 1951 2 SHEETS—SHEET 2

INVENTOR
KENNETH J. VAUGHN,
BY
*McMorrow, Berman + Davidson*
ATTORNEYS

Patented Sept. 23, 1952

2,611,453

UNITED STATES PATENT OFFICE 2,611,453

HYDRAULIC DISK BRAKE

Kenneth J. Vaughn, Middletown, Va.

Application July 6, 1951, Serial No. 235,463

2 Claims. (Cl. 188—152)

This invention relates to brakes, and more particularly to fluid pressure-operated brakes for use with motor vehicles.

A main object of the invention is to provide a novel and improved hydraulic disc brake structure which involves relatively few parts, which is easy to install, and which is reliable in operation, as well as easy to service at low cost to the user.

A further object of the invention is to provide an improved motor vehicle brake assembly which is inexpensive to manufacture, which is compact in size, which provides exceptionally large braking area as compared with the brake assemblies of the prior art of comparable size and weight, which is air-cooled, which involves no brake drums, which has high resistance to wear, and which is arranged so that leakage of brake fluid from the brake cylinders will not cause the fluid to run on the brake lining and will therefore not adversely affect the brake lining or cause uneven braking.

Further objects and advantages of the invention will become apparent from the following description and claims, and from the accompanying drawings, wherein:

Figure 2:
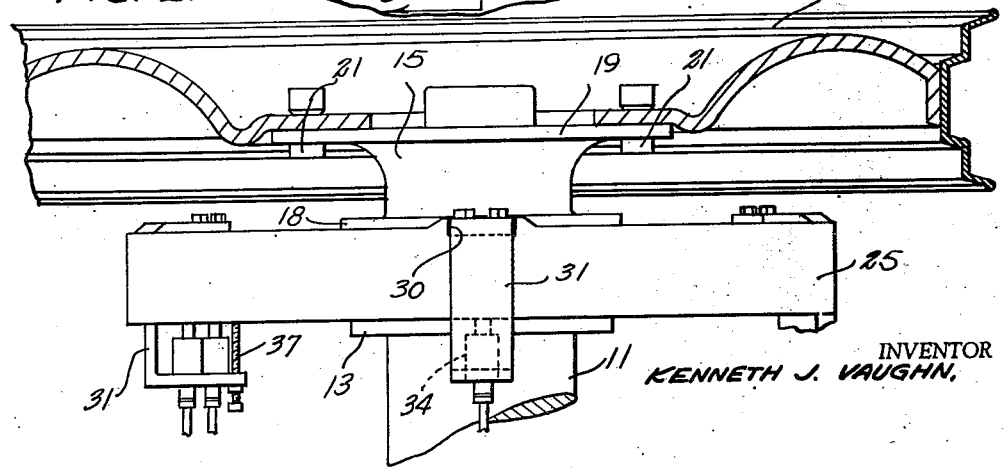
Figure 2 is a horizontal cross-sectional view taken through the vehicle wheel with which the improved brake assembly is associated, said view showing the brake assembly in top view.
Figure 3:
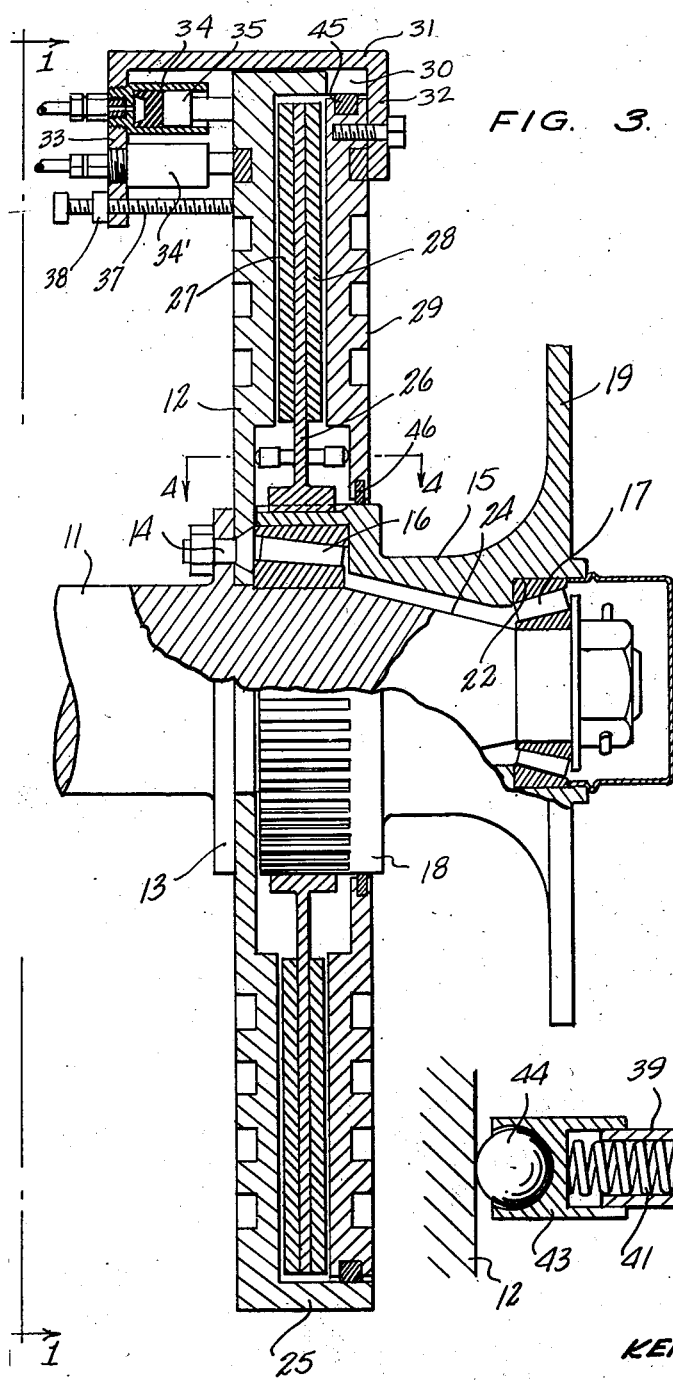
Figure 3 is an enlarged vertical cross-sectional view taken on the line 3—3 of Figure 1.

Referring to the drawings, 11 designates a wheel spindle, and 12 designates the circular backing plate which is bolted to an annular flange 13 on the spindle 11 as by a plurality of bolts 14. Designated at 15 is the wheel hub which is rotatably mounted on the spindle 11, as by the respective roller bearing units 16 and 17. The hub 15 is formed with the splined annular housing 18 which houses the bearing unit 16, the housing 18 being located adjacent the backing plate 12, as shown in Figure 3. The hub 15 is formed at its outer end with the flange 19 to which the vehicle wheel 20 may be bolted, as shown in Figure 2, as by bolts 21, and the bearing unit 17 is housed in an annular recess 22 located substantially in the same plane as the flange 19. As shown in Figure 3, the spindle 11 is tapered at 24 between the bearing assemblies 16 and 17.

Figure 4:
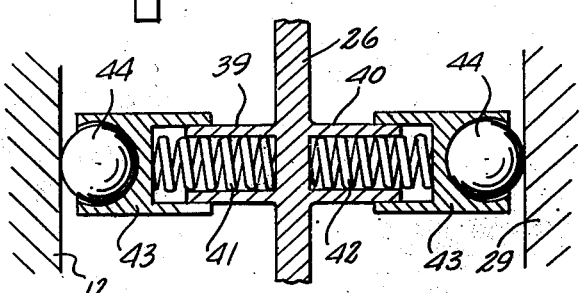
Figure 4 is an enlarged cross-sectional detail view taken on the line 4—4 of Figure 3.

The backing plate 12 is formed with a peripheral flange 25. Designated at 26 is a friction disc which is slidably and non-rotatably engaged on the splined housing 18, the disc 26 being provided on its opposite faces with the annular friction pads 27 and 28. Designated at 29 is an annular disc member which is disposed parallel to the disc member 12, the friction disc 26 being received between the respective disc members 12 and 29. The flange 25 of disc member 12 is formed with a plurality of notches 30, and secured to the peripheral portion of the disc member 29 are respective, generally C-shaped bracket members 31 whose bight portions slidably engage the outer cylindrical peripheral surface of the flange 25 and whose outer arm portions 32 are slidably received in the respective notches 30 to limit rotation of the disc member 29 relative to the disc member 12. The inner arm portions of the C-shaped members 31 are designated at 33, and secured to each of said inner arm portions are respective fluid pressure cylinders 34, said cylinders being located inwardly of the bracket members 31 and being directed toward the disc member 12. The plungers 35 of the cylinders 34 extend parallel to the spindle 11 and engage the disc member 12, as shown in Figure 3. Threaded through the respective arms 33 are adjusting screws 37 which are adapted to be engaged with the disc member 12 to establish a normal position of the disc member 29 relative to the disc member 12, said adjusting screws being provided with lock nuts 38. As shown in Figure 4, the friction disc 26 is formed inwardly of the pads 27 and 28 with a plurality of sets of opposed, hollow projections 39 and 40 containing coil springs 41, 42. Spirally engaged on each of the projections 39 and 40 are respective caps 43 provided with rotatable contact balls 44 which respectively engage the disc member 12 and the disc member 29 to bias said disc members apart. As shown in Figure 3, the spreading apart of the disc members 12 and 29 is opposed by the abutment of the stop screws 37 with the disc member 12, and, as explained above, the normal spacing between the disc members 12 and 29 can be regulated by adjusting said stop screws.

As shown in Figure 3, the periphery of the disc 29 is provided with a deformable ring 45 which engages the inside surface of the peripheral flange 25 of disc 12, and acts as a dust seal without interfering with the ability of disc 29 to slide toward or away from disc member 12. A similar ring 46 of deformable material is secured in the inner peripheral edge of the disc 29, the deformable ring 46 engaging the periphery of the housing 18 and sealing the space between the disc 29 and housing 18 against the entry of dust.

Figure 1:
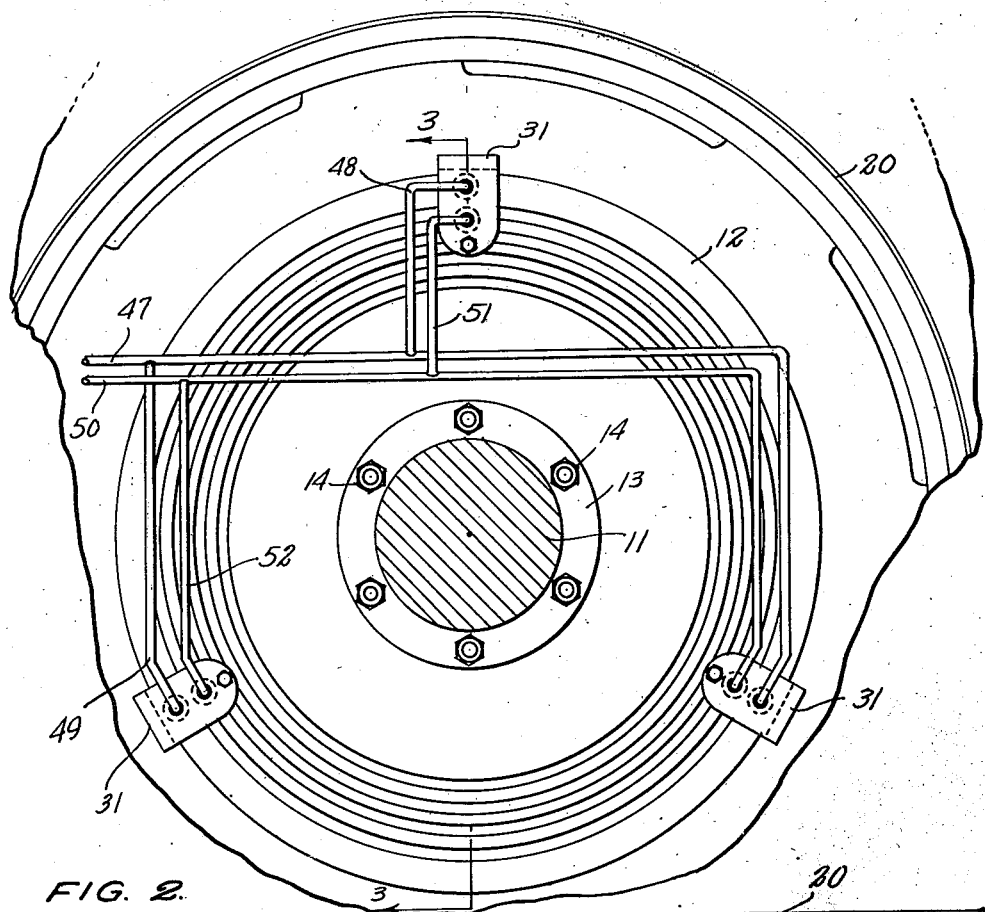
Figure 1 is a cross-sectional view taken on the line 1—1 of Figure 3, and showing the upper portion of a typical brake assembly according to the present invention, as viewed from the interior side of the vehicle wheel associated with the brake assembly.

In Figure 3 the brake cylinders 34 may be connected to a fluid pressure system controlled by the vehicle brake pedal, as for example, the system connected to the respective conduits 47, 48 and 49 in Figure 1. Additional fluid pressure brake cylinders 34' are provided on the arms 33 which may be connected to another fluid pressure system controlled by the vehicle hand brake lever and including the conduits 50, 51 and 52, shown in Figure 1.

In operation, when either of the fluid pressure systems is actuated to introduce fluid pressure into the brake cylinders associated therewith, the plungers of said cylinders move against the disc members 12 of the associated brake assemblies and cause the disc members 29 to be moved toward the associated disc members 12. The disc members 29 engage the friction discs 26 and force said discs against the adjacent disc members 12, thereby exerting braking force on the wheels of the vehicle. When the fluid pressure is released, the disc members 29 are moved outwardly to their normal positions relative to the disc members 12 by the expansion of the springs 41 and 42 carried by the brake discs 26.

It will be readily apparent that the annular braking pads 27 and 28 provide a relatively large braking area as compared with conventional brakes of the band type, and that the braking area in the above-described device is much greater than in a brake assembly of the band type for a brake assembly of given over-all size. It will be further apparent that relining the brake discs 26 may be accomplished rapidly and inexpensively, since it is merely necessary to remove the disc member 29 and the wheel hub to provide access to the brake discs 26. The brake assemblies may be employed on all four wheels of a vehicle and may be employed with equal effectiveness when actuated either by the hand brake lever or by the brake pedal. It is thus apparent that the present invention provides a true emergency brake, and not merely a "parking" brake. The mechanism involves no brake cables which rust, corrode, fray from wear, or freeze, and therefore provides more reliable operation than the conventional brake assemblies heretofore employed. It will also be apparent that the brake assembly can be easily adjusted for wear, since the brake cylinders 34, 34' are readily accessible and the hand brake system may be employed as a reference means for adjusting the elements of the pedal-operated portion of the brake system.

While a specific embodiment of an improved vehicle brake assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a spindle, a hub rotatably mounted on said spindle, a disc member rigidly secured to said spindle, a notched peripheral flange on said disc member, an annular plate member slidably and rotatably engaged on said hub parallel to said disc member, respective brackets secured to said plate member and slidably engaging the notches in said flange, said brackets extending around said flange to the opposite side of said disc member, expansible fluid pressure means on said brackets engaging said disc member and being arranged to move said plate member toward said disc member, and a friction disc slidably and non-rotatably engaged on said hub between said disc member and said annular plate member and arranged to be brakingly urged against said disc member when said plate member is moved toward said disc member.

2. In a vehicle, a spindle, a hub rotatably mounted on said spindle, a disc member rigidly secured to said spindle, a notched peripheral flange on said disc member, an annular plate member slidably and rotatably engaged on said hub parallel to said disc member, respective generally C-shaped brackets secured to said plate member and slidably engaging the notches in said flange, said brackets extending transversely around said flange to the opposite side of said disc member, expansible fluid pressure means on said brackets engaging said disc member and being arranged to move said plate member toward said disc member, a friction disc slidably and non-rotatably engaged on said hub between said disc member and said annular plate member and arranged to be brakingly urged against said disc member when said plate member is moved toward said disc member, and spring means biasing said friction disc toward an intermediate position between said disc member and said annular plate member.

KENNETH J. VAUGHN.

REFERENCES CITED

The following references are of record in the file of this patent:

UNITED STATES PATENTS

| Number | Name | Date |
| --- | --- | --- |
| 2,044,989 | La Brie | June 23, 1936 |
| 2,064,595 | Dodge | Dec. 15, 1936 |
| 2,068,956 | La Brie | Jan. 26, 1937 |